(12) United States Patent
Ylipelkonen

(10) Patent No.: US 6,450,636 B1
(45) Date of Patent: Sep. 17, 2002

(54) ANTI-GLARE EYEGLASSES

(76) Inventor: Risto Ylipelkonen, 505 S. Flagler Dr., West Palm Beach, FL (US) 33401

( * ) Notice: Subject to any disclaimer, the term of this patent is extended or adjusted under 35 U.S.C. 154(b) by 0 days.

(21) Appl. No.: 09/677,733

(22) Filed: Oct. 2, 2000

(51) Int. Cl.⁷ .................................................. G02C 7/16
(52) U.S. Cl. ............................. 351/45; 351/46; 351/47
(58) Field of Search ............................... 351/45, 46, 47, 351/57, 44, 41

(56) References Cited

U.S. PATENT DOCUMENTS

| 1,706,429 A | 3/1929 | Willard |
| 2,109,115 A | 2/1938 | Kleine |
| 2,511,776 A | 6/1950 | Kelly |
| 2,660,728 A | 12/1953 | Thornton |
| 2,687,524 A | 8/1954 | Mosher |
| 2,861,496 A | 11/1958 | Thornton |
| 2,981,956 A | 5/1961 | Thompson |
| 3,092,838 A | 6/1963 | Vacha |
| 3,664,733 A | 5/1972 | Kalkowski |
| 3,838,913 A | 10/1974 | Schwarz |
| 4,023,892 A | 5/1977 | Smith |
| 4,678,296 A | 7/1987 | Smith |
| 4,859,047 A | 8/1989 | Badewitz |
| 4,944,583 A | 7/1990 | Jennings |
| 5,675,398 A | * 10/1997 | Moore .......................... 351/45 |

* cited by examiner

*Primary Examiner*—Hung Xuan Dang
(74) *Attorney, Agent, or Firm*—Ted W. Whitlock

(57) ABSTRACT

An optical device for reducing glare which can be attached to ordinary eyeglasses or adapted to be worn as a pair of glare-reducing eyeglasses. The device includes lenses which have both transparent and translucent areas. The lenses are independently adjustable for individualizing the position of the lenses and thereby individualizing the glare-reducing capacity of the device. During operation, the lenses can be positioned such that the wearers' pupils are in alignment with the transparent area.

19 Claims, 5 Drawing Sheets

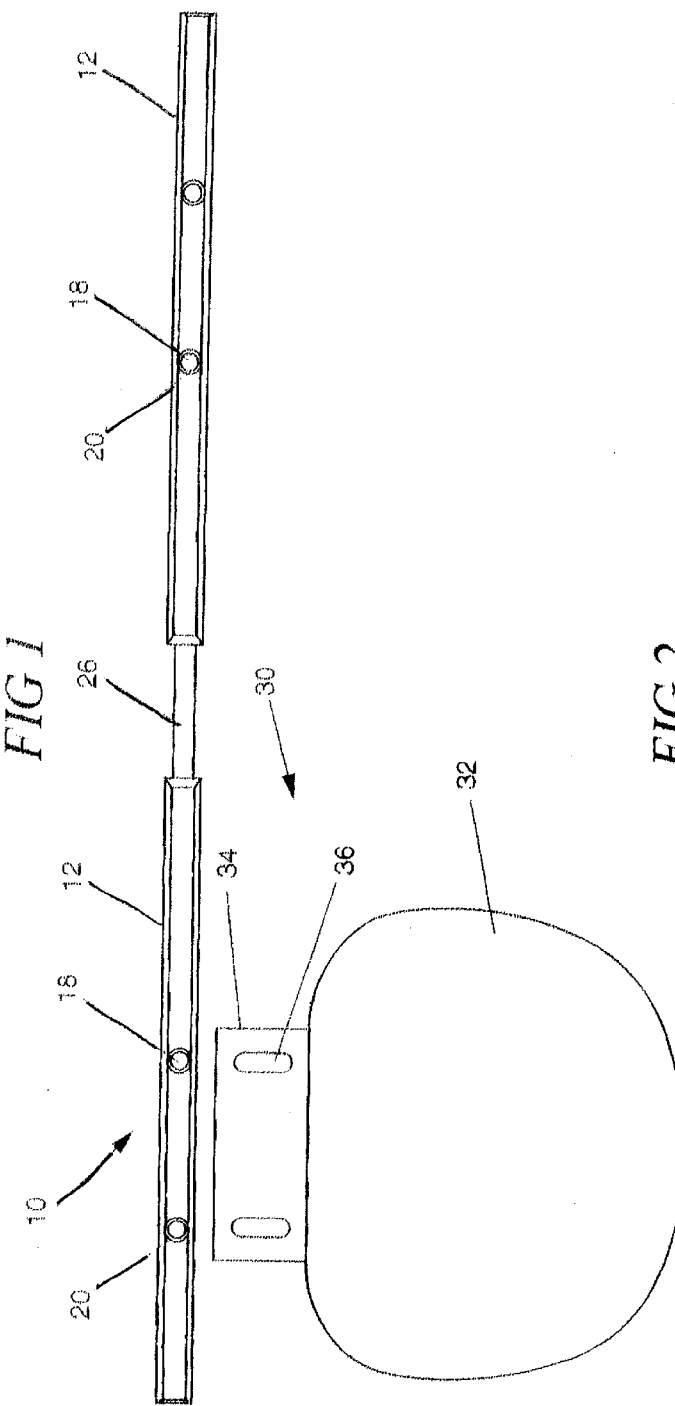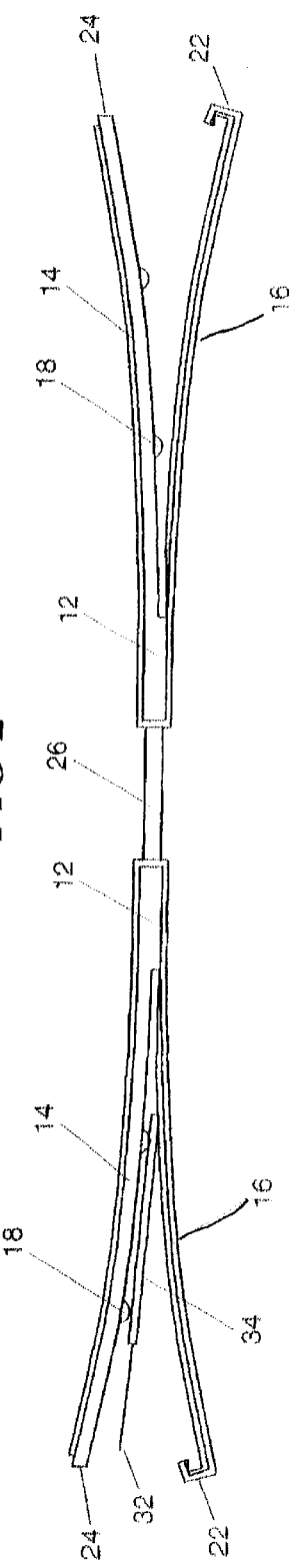

ANTI-GLARE EYEGLASSES

FIELD OF THE INVENTION

This invention relates generally to eyeglasses and more particularly to glasses adapted for reducing glare, e.g., from the headlights of an approaching vehicle during night driving.

BACKGROUND OF THE INVENTION

Glare is well-known to interfere with normal vision and can be a source of irritation of the eye, even to the extent of causing temporary blindness. The glare from the sun or, at night, approaching vehicle headlights, is a long recognized source of danger, impaired vision, fatigue and irritation to unprotected drivers. The danger increases with extended time of driving and causes many drivers to limit or even avoid driving at night altogether. A number of anti-glare devices having varying configurations have been devised in an effort to address this problem. However, each of these known devices has at least one disadvantage solved by the present invention.

Certain patents have issued describing devices which purportedly address the problem of glare. For example, U.S. Pat. No. 4,678,296 to Smith; U.S. Pat. No. 2,511,776 to Kelly; and U.S. Pat. No. 1,706,429 to Willard each describe glare-reducing eyeglasses comprising fixedly mounted lenses having transparent and translucent regions of a particularly defined geometry. However, the inability to adjust the lenses relative to the frame in these devices imparts a particular disadvantage of being unable to optimize the glare-reducing capability for each individual wearer.

U.S. Pat. No. 4,859,047 to Badewitz describes glare-reducing glasses comprising wrap-around filter lenses supported on a single frame. Although the assembly taught by Badewitz can be coupled to prescription eyeglasses via a mechanical clip, and the lenses repositioned, the lenses are not freely adjustable to the individual wearer. Repositioning of the Badewitz device requires adjusting the length and shape of the mechanical coupling clip. Consequently, the lenses can not be individually adjusted.

Mosher, in U.S. Pat. No. 2,687,524 describes an adjustable and removable eyeshade for eyeglasses. The Mosher eyeshade comprises a pair of tinted strips connected at their inner edges by a coil spring. The strips each have hooks at their uppermost and lowermost edges for gripping the edges of the eyeglass frame. Horizontal or vertical shade adjustment requires adjusting the bend in one or more of the hooks. The device includes numerous mechanically-dependent components. Furthermore, as a result of the configuration of the assembly, individual shade adjustment is not possible.

Other known glare-reducing devices incorporate shading means whereby glare-reduction results in the scope of vision of one or both eyes being at least partially impeded. Furthermore, known anti-glare devices suffer a number of additional, non performance- related, disadvantages. For instance, many existing glare-reducing devices are comprised of complicated assemblies having numerous individual components. As a result, lens adjustment is relatively complicated; in some cases, requiring the use of a tool such as a screwdriver.

For the foregoing reasons, it would be desirable to have a wearable anti-glare device having freely adjustable lenses capable of effectively minimizing the transmission of glare toward the eyes of the wearer. The device should be relatively inexpensive to manufacture, have a minimal number of components, and be simple enough for the wearer to quickly adjust, if necessary, without the requirement of tools. Such advantages, and others which will be readily apparent by the description and drawings provided herein below, are accomplished by the subject invention.

SUMMARY OF THE INVENTION

It is an object of this invention to provide a glare-reducing optical assembly particularly useful for night driving to prevent glare from headlights of an approaching vehicle from interfering with the vision of the wearer while operating a vehicle.

It is another object of this invention to provide such an optical assembly adaptable for being coupled to a set of spectacles or eyeglasses or, alternatively, adaptable for being worn as a set or pair of eyeglasses.

It is yet another object this invention to provide an optical assembly capable of effectively reducing the glare, e.g., glare associated with the headlights of an approaching vehicle, without requiring the wearer to. alter the position of his head in order to properly position the optical assembly for reducing glare.

It a further object of this invention to provide an optical assembly that is relatively inexpensive to manufacture, has a minimal number of individual components, and includes easily adjustable lenses so that normal vision is maintained at the focal point of the field of vision, i.e., immediately in front of the pupils, of the wearer and the light-shading aspect of the invention remains outside the focal point of the wearer's vision.

Preferably, the light shading aspect of the invention comprises a translucent or shaded area of each lens and defines a non-shaded area, e.g., a transparent area, having a tip or apex substantially coinciding with midpoint of the lens. Furthermore, it is preferred that each lens is adjustably positionable such that the pupil of the wearer's eye, and thereby the field of vision of the wearer, is aligned with this apex of the transparent area. More preferably, the non-shaded,. e.g., transparent area defined by the translucent or shaded area, is V-shaped, or most preferably having an inverted V-shape.

It is yet a further object of the invention to provide a device or assembly for glare-reduction wherein the lenses are individually adjustable so that this position can be achieved and maintained for each individual wearer.

These and other objects are achieved with the assembly of the present invention. Briefly, according to one embodiment of the invention, a glare-reducing optical device includes an individually adjustable pair of lenses adapted with tab members for releasable attachment to the frame of a pair of glasses. Each lens comprises a non-shaded, e.g., transparent, area allowing light rays to pass through substantially unimpeded and a translucent area for impeding the transmission of light rays into the eyes or field of vision of the wearer. In particular, the non-shaded area of the lens, according to the subject device or assembly, remains positioned immediately in front of the pupil or field of vision of the wearer.

The subject invention further comprises a device having a frame for affixing the lens thereto to form a pair of glasses. The frame comprises a lens fixturing portion, and preferably, a pair of lens fixturing portions connected by a bridge member. More preferably, the frame comprises a unitary piece forming the lens fixturing portions and bridge member molded from a suitable material, e.g., plastic, composite, or lightweight metal. In a preferred embodiment, lens fixturing portions include rear and front portions adapted for securely fixturing the lenses to the frame. Preferably, the front and rear lens fixturing portions are formed in a pre-stressed manner so they spring away from each other, or splay, in order to easily receive lens tab members therebetween. The front and rear lens fixturing portions can also include a means for holding these portions together in a closed position to hold the lens in place.

In a particularly preferred embodiment, rear lens fixturing portion can include a at least one nub, and preferably at least two nubs or protrusions adapted for being snugly received by corresponding apertures formed in the front lens fixturing portion. In operation, front and rear lens fixturing portions can be splayed apart into an open position and lens tab member positioned such that the protrusions extend through corresponding slots correspondingly formed in the lens tab member. These slots are preferably dimensioned such that both horizontal and vertical lens adjustment is possible. With the lenses adequately positioned, rear and front lens fixturing portions can be fastened, e.g., clipped or snapped together, and thereby positionally affixing the lens in a fixed position. Preferably, front and rear fixturing portions include a means for fastening one to another. For example, front fixturing portion can include a clip such as a hooked, or C-shaped, end adapted for engaging and holding a corresponding end of rear fixturing portion. Preferably, the assembly can be attached to a pair of eyeglasses, via bridge member or nosepiece of the pair of glasses, using a mechanical fastening means such as a screw or a clip.

In an alternate embodiment, the assembly can further include a pair of arms, fashioned as earpieces, which can enable the device to function as alone as a pair of eyeglasses without requiring the assembly to be used in conjunction with a separate pair of eyeglasses. In this alternate embodiment it is preferable that the bridge member is shaped or contoured for being comfortably supported on the bridge of the wearer's nose.

BRIEF DESCRIPTION OF THE DRAWINGS

FIG. 1 is a front view of an optical assembly in accordance with an embodiment of the present invention, in which the assembly frame is shown in a closed position and a single lens is shown detached from the device frame;

FIG. 2 is a top view of an optical assembly in accordance with an embodiment of the present invention, in which the assembly frame is shown in an open position and a single lens is shown in a disassembled state;

DETAILED DESCRIPTION OF THE PREFERRED EMBODIMENTS

Figure 3:
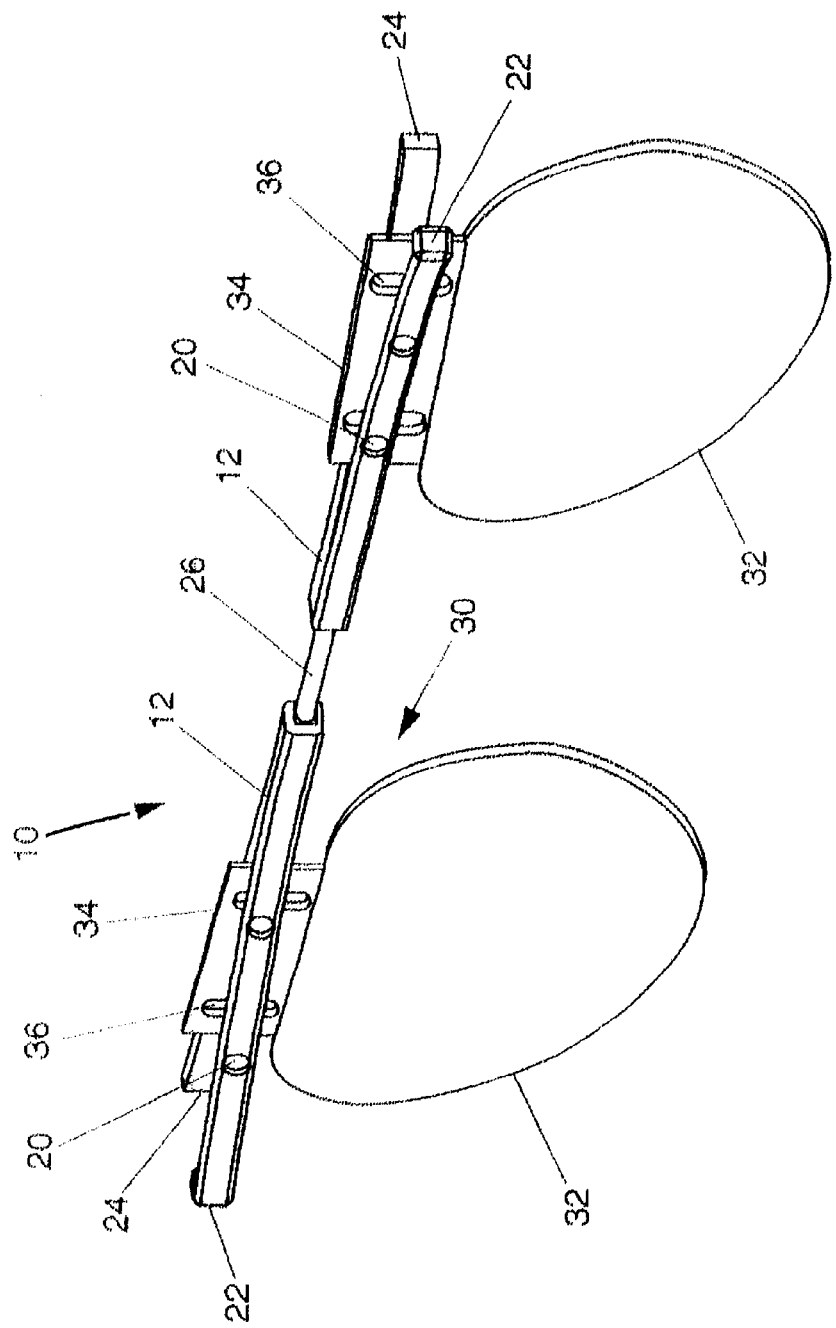
FIG. 3 is a perspective view of an optical assembly, shown in an open position, in accordance with one embodiment of the present invention.

Generally, the subject invention concerns an eyeglass assembly which includes at least one glare-reducing lens removably affixed to a frame, wherein the lens is adjustable relative to the frame such that the lens can be positioned for optimal glare-reduction for the individual wearer of the assembly. Referring to the figures, preferred embodiments of the subject device are shown. FIGS. 1–6 show a device, or assembly, in accordance with a first preferred embodiment of the invention. Specifically, FIGS. 1–4 show a lens assembly 30 releasably attachable to device frame 10 via lens tab member 34. The device of the present invention can have corrective or non-correcting lenses formed of glass, resin, or combinations of glass and resin. Lenses 32 can also be made of photochromic glass to serve as sunglasses in bright daylight.

As shown in FIGS. 1–4, frame 10 comprises a pair of lens fixturing portions 12 forming left and right frame portions. The left and right frame portions are connected by a bridge member 26. In a preferred embodiment of the invention, the entire frame 10, including lens fixturing portions 12 can be molded from a suitable lightweight material, e.g., plastic, metal, composite as accepted in the art, to form a unitary structure. In this manner, the number of individual components of the present invention is greatly reduced, resulting in a durable assembly that can be efficiently and inexpensively manufactured.

Lens fixturing portions 12 comprise rear and front portions, 14 and 16, respectively, adapted for securely fixturing a lens tab member 34 therebetween. More specifically, lens fixturing portions 12 are formed to be splayed apart from one another, in an open position, for receiving lens tab member 34. Rear lens portion 14 has at least one nub or protrusion, and preferably at least one pair of nubs or protrusions 18 adapted for being snugly received by corresponding apertures 20 extending through front lens fixturing portion 16. With rear and front portions 14 and 16 in a splayed or open position (see FIGS. 2–3), lens tab member 34 is positioned such that protrusions 18 extend through the corresponding tab member slots 36. These slots 36 are dimensioned to provide an opening at least slightly larger than the dimensions of the protrusions 18, enabling slight positional adjustment of the lens, at least in a horizontal or vertical direction as necessary to properly position the transparent area of the lens at the focal point of the field of vision for each individual wearer.

Figure 4:
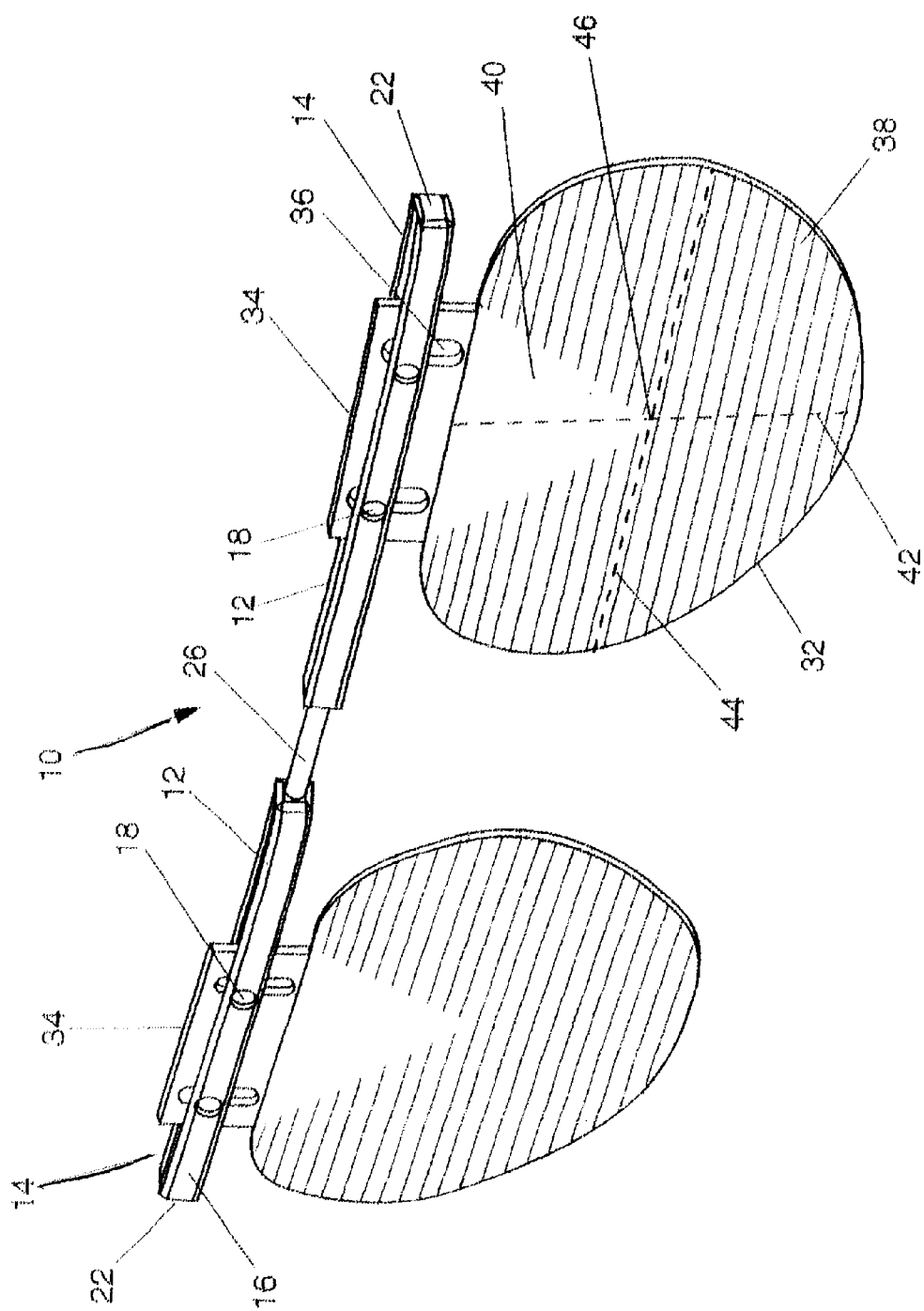
FIG. 4 is a perspective view of a glare-reducing optical assembly, shown in a closed position, and illustrating the translucent glare-reducing area (shading) on the lenses in accordance with one embodiment of the present invention.

Referring now to FIG. 4, each lens 32 can comprise a substantially transparent area 40 and a translucent area 38. As used herein, the term "transparent" is intended to indicate a non-shaded area, e.g., a cut-out area or an area comprising substantially clear, or non-shaded, glass or other material typically used for lenses, e.g., plastic or other polymer. The term "translucent" signifies any glass, plastic or other material having light absorbing properties or light shading properties. The translucent area 38 is intended to absorb or block an amount of the light rays from incident light, e.g., light originating from another vehicles' headlights, in order to reduce interference with the vision of the wearer.

This translucent area 38 can be made of glass, either optical or other colored glass, or such other material as will provide suitable means for carrying out the purpose of the invention. Preferably, the lens is formed as a single unit herein one area is made translucent by shading or tinting using conventional procedures. It will be apparent to one skilled in the art that there are myriad materials and processes available for creating the desired lens shading. The particular materials and processes used are not considered part of the invention.

Alternatively, the translucent area 38 can be made separately and matchingly adjoined to the transparent area 40 of the lens to form a unitary lens. In addition, the translucent area 38 can be a sheet of tinting material overlain or disposed on a substantial transparent lens. By shading a particular area of the lens, there remains a transparent area in a central portion of the lens such that the transparent area overlays the field of vision, particularly at the focal point of vision, of the wearer when the assembly is worn.

Dotted lines 42 and 44, shown on lens 32 in FIG. 4, have been included for reference purposes only; these dotted lines represent vertical and horizontal centerlines, respectively, dividing lens 32. In one embodiment, the translucent, or shaded, portion 38 defines a corresponding V-shaped transparent area 40 having a tip or apex 46 substantially coinciding with the intersection of centerlines 42 and 44. As used herein, the term "lens midpoint" is used to describe said intersection.

Figure 5:
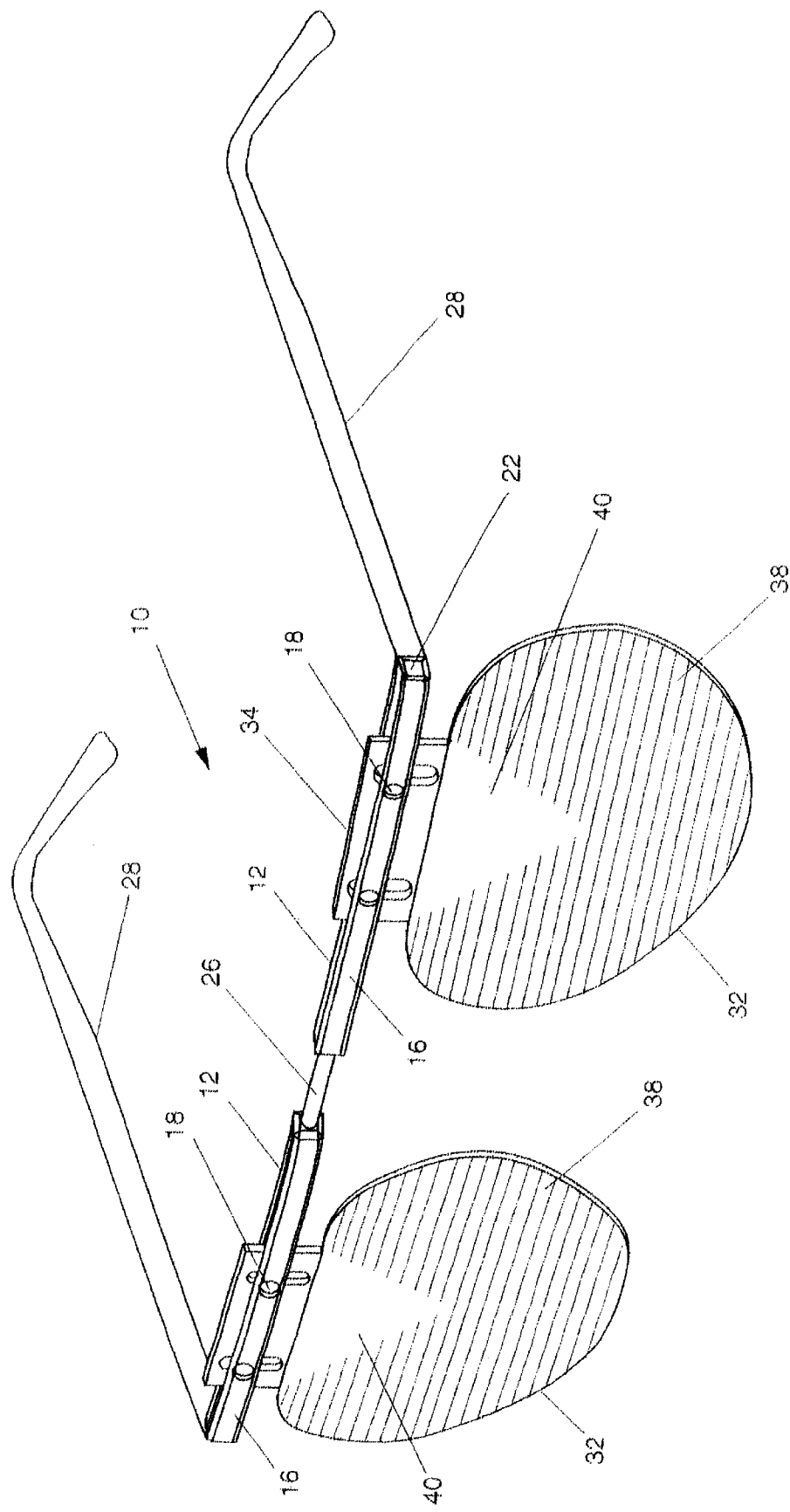
FIG. 5 is a perspective view of a glare-reducing optical assembly in accordance with an alternate embodiment of the present invention.

Referring now to FIG. 5, an alternate embodiment of the present invention can comprise an assembly which is adapted to function as eyeglasses, in lieu of requiring attachment to a set of eyeglasses. This embodiment of the subject device can include arms 28, also commonly referred to as earpieces, attached to the frame at ends 22. For instance, arms 28 can be attached using common mechanical hinges, thereby allowing the arms to be compactly folded against the frame during storage. Preferably, bridge member 26 is contoured for comfortably resting on the bridge of the wearer's nose.

Figure 7:
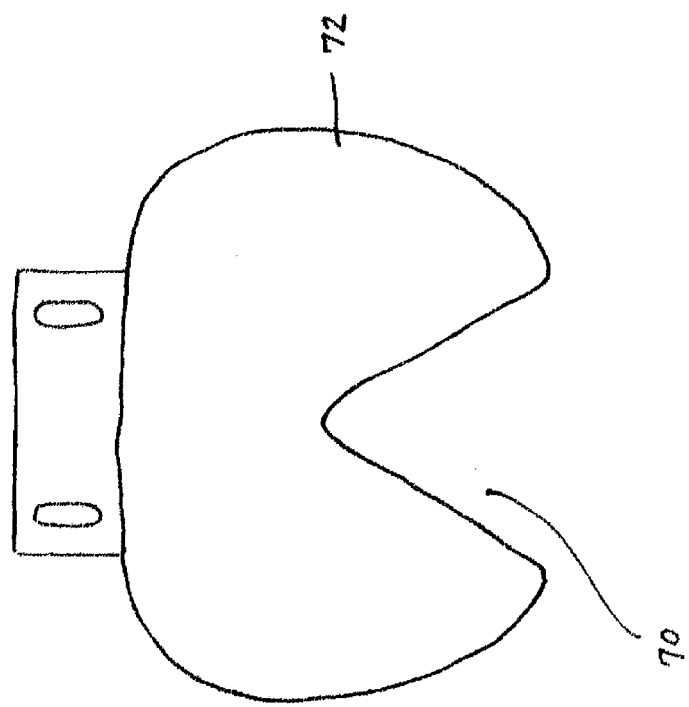
FIG. 7 illustrates another alternative embodiment of the subject invention wherein the non-shaded area of the lens is formed by a cut-out section of the lens defined by the shaded area of the lens.
Figure 6:
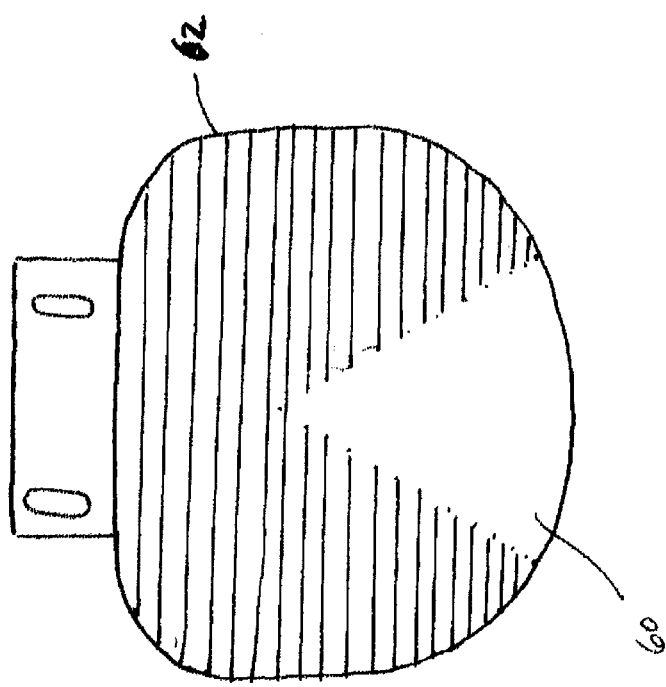
FIG. 6 illustrates an alternative embodiment of the glare-reducing area (shading) on a lens used in accordance with the subject invention.

Variations of the V-shaped transparent area are shown in FIGS. 6 and 7. Specifically, FIG. 6 shows a lens 62 having an inverted V-shaped transparent area 60 comprising lens material which is substantially free of shading. FIG. 7 represents a further variation of a lens 72 wherein the transparent area 70 is formed by a complete absence of lens material. It is noted that the angle of the V-shaped area can vary for any of these embodiments, but is preferably about 30–60 degrees, and more preferably about 45 degrees.

In addition, for optimal glare-reducing capacity while driving, it is preferable that the pupils of the wearer's eyes are aligned with apex 46. Moreover, the shape of the transparent area 40 is not critical, i.e., can be a modified V-shape or other angled shape so long as the lens is positioned such that the wearer views through the transparent area and incident light outside the focal point of the wearer's vision is blocked or reduced by the shaded, translucent area. An aspect of the subject invention which allows the proper relative positioning of the transparent and translucent areas as described is the capability of the lens to be easily adjusted for each individual wearer.

Referring back to FIGS. 1–5, lens tabs 34 extending from the upper side of each lens 32 provide a means for adjustably attaching lenses 32 to frame 10. The tabs can be integrally formed with the lens, e.g., molded as part of the lens during initial manufacture, or can be separate members which are affixed or adhered to the lens and thereby are made integral therewith.

Once a lens is adequately positioned for a particular wearer, i.e., such that the wearer's pupils and focal point of vision are aligned with apex 46, rear and front fixturing portions 14 and 16 can be engaged and held together in a closed position, e.g., snapped together, thereby frictionally holding the lens tab member 34 and preventing subsequent movement of lens 32 from its desired position.

Front fixturing portion 16 can also preferably include end 22 which is adapted for engaging a corresponding end 24 of rear fixturing portion 14. For example, one embodiment can include a hook, or C-shaped end formed as part of or made integral with front fixturing portion 16 such that a clip is formed for engaging and holding the corresponding end 24 of rear lens fixturing portion 14.

It will be apparent to one skilled in the art that the assembly of the present invention is adaptable for being connected, preferably via bridge member 26, to a separate pair of eyeglasses. The assembly according to the subject invention can be connected to the separate pair of eyeglasses using any of various connection means commonly used in the art including, but not limited to, clips, hangers, set screws, or the like.

While the preferred embodiments of the invention have been illustrated and described, it will be clear that the invention is not so limited. For example, it would be well understood that the subject assembly can be adapted so that the lenses can be flipped upwardly when not in use, but remaining attached to the frame or separate pair of eyeglasses. This "flip-up" variation is well known in the art.

Numerous other modifications, changes, variations, substitutions and equivalents will occur and be readily apparent to those skilled in the art without departing from the spirit and scope of the present invention as described and claimed.

I claim:

1. An optical assembly for reducing glare, said assembly comprising:

an adjustably positionable lens having a substantially transparent area therein, said transparent area coincides with the direct field of vision of an individual wearer and is defined by a bordering translucent or shaded area outside the direct field of vision of the wearer, said assembly further comprising a frame having left and right lens attachment portions connected by a bridge member wherein the lens attachment portions are configured as a single unit comprising a front and rear lens attachment member which splay apart in relation to one another to releasably engage lens tab members to hold said lens in position.

2. The optical assembly of claim 1, wherein the transparent area coincides with the focal point of the field of vision, or pupil, of the wearer.

3. The optical assembly of claim 2, wherein said front and rear lens attachment members comprise a fastening means for fastening one of said front and rear lens attachment members to the other.

4. The optical assembly of claim 3, wherein one of said front and rear lens attachment portions has a hooked end for engaging a corresponding end of the other corresponding front and rear attachment member.

5. The optical assembly of claim 3, wherein said assembly comprises a bridge member adapted for supporting said assembly on the nose of a wearer.

6. The optical assembly of claim 1, wherein the lens comprises a tab member integral with said lens.

7. The optical assembly of claim 1, wherein the front and rear lens attachment members fasten together to engage one another in a closed position.

8. The optical assembly of claim 1, wherein the front and rear lens attachment members include a fastening means integral therewith for fastening together said front and rear lens attachment members in a closed position.

9. The optical assembly of claim 1, wherein one of the front and rear lens attachment members comprises a protrusion thereon adapted to extend through a slot formed in lens tab member, and the other of the front and rear lens attachment members comprises an aperture positionally corresponding to said protrusion for receiving the protrusion therein when the frame is in a closed position.

10. The optical assembly of claim 9, wherein the aperture formed in said lens tab member is dimensionally greater than the protrusion to permit positional movement or adjustment of the lens.

11. The optical assembly of claim 1, wherein the transparent area is provided as a substantially V-shaped area.

12. The optical assembly of claim 11, wherein the vertex of said V-shaped area is positioned such that the transparent area is positioned substantially over the focal point of the field of vision of the wearer.

13. The optical assembly of claim 11, wherein the V-shaped area is defined by shading which borders the V-shaped area.

14. The optical assembly of claim 11, wherein the V-shaped area is formed as a cut-out area which is free of lens material.

15. The optical assembly of claim 11, wherein the transparent area is an inverted V-shape.

16. The optical assembly of claim 1, wherein said assembly is adapted for attachment-to a separate set of eyeglasses.

17. The optical assembly of claim 1, said optical assembly further comprising a pair of arms or earpieces adapted for being supported by the ears of a wearer.

18. An optical assembly for reducing glare for a wearer of the assembly, said assembly comprising:
- a pair of independently positionally adjustable lenses, said lenses having a transparent area and a bounding translucent area, each lens being positionally adjustable such that the transparent area substantially coincides with the field of vision of the wearer;
- a pair of tab members each extending from an upper edge of one of said lenses, said lens tab members including a pair of slots extending therethrough;
- a frame comprising left and right lens attachment portions connected by a bridge member, said lens attachment portions each adapted for releasably engaging and holding in place a lens tab members and comprising front and rear attachment members affixable to one another and having an integral protruding member extending therefrom and an aperture extending therethrough for releasably engaging said protruding member when said lens attachment portion is in a closed position.

19. A method for reducing glare for an individual, said method comprising providing an optical assembly having a pair of lenses, each lens comprising a substantially transparent area and a bordering translucent area wherein each lens is independently positionally adjustable to, position the substantially transparent area in front of the pupil of the wearers
- said assembly further comprising a frame having left and right lens attachment portions connected by a bridge member wherein the lens attachment portions are configured as a single unit comprising a front and rear lens attachment member which splay apart in relation to another to releasably engage lens tab members to hold said lens in position.

* * * * *